United States Patent Office 2,902,390
Patented Sept. 1, 1959

2,902,390

METHOD OF COATING METAL SURFACE WITH HEXAVALENT CHROMIUM COMPOUND AND POLYACRYLIC ACID

Ernest P. Bell, Detroit, Mich., assignor to Parker Rust Proof Company, Detroit, Mich., a corporation of Michigan No Drawing. Application July 1, 1955
Serial No. 519,620

4 Claims. (Cl. 117—132)

The present invention relates generally to metals or articles of metal having a surface coated with an insolubilizable or insoluble corrosion-resistant and adhesion-promoting material and to solutions and a method for providing such coatings on metals. More specifically the invention relates to articles of metal having insoluble resinous coatings thereon containing dispersed hexavalent chromium and to solutions and a process for providing such coatings.

Metal surfaces have been coated with adherent phosphate or oxalate coatings to protect the metal against corrosion and to improve the adherence of paints and other finishing materials to the metal. In the copending application of Donald S. Andrade, Serial No. 519,619, filed of even date herewith, there is disclosed a new type of protective and adhesion-promoting coatings for metal comprising hexavalent chromium (dispersed or distributed in, dissolved in or reacted with) an insoluble organic matrix. In the aforementioned copending application this type of coating is formed on the metal by wetting the surface with a solution of a hexavalent chromium compound such as chromic trioxide or chromic acid in an organic vehicle such as tertiary butyl alcohol and heating the wetted surface to form thereon an insoluble coating comprising an insoluble organic film-forming or matrix-forming material of unknown composition containing dispersed, dissolved or reacted hexavalent chromium. The method of the copending application employs an essentially organic solution which gives rise to the danger of flash fires during processing. The organic vehicles disclosed and claimed in the copending application may be termed "monomeric" in nature since they are converted by heat from a liquid, non-polymeric or non-resinous condition to an insoluble, polymeric or heat-converted form.

In accordance with the present invention, bare metal articles are provided with a surface coating of a similar type having properties similar to those of the above-mentioned copending application by employing an essentially aqueous solution containing hexavalent chromium and a matrix-generating organic vehicle in an already polymeric form which is convertible on the metal surface by drying and/or heating to an insolubilizable or insolubilized resinous form. The character of the insoluble coatings produced by the process of the present invention likewise is not fully understood but it is known that both the polymeric matrix and the hexavalent chromium are present on the metal surface in a form in which they are not easily removed and/or extracted by aqueous and organic solvent systems, and are not sensitive to a humid atmosphere or to organic solvents, paint thinner, etc. In some cases there is some evidence (i.e. presence of trivalent chromium in coating and formation of a sludge on standing of solution) that at least a portion of the chromium in the coating has reacted wtih the matrix material. In all cases the hexavalent chromium is believed to be more or less uniformly distributed throughout the coating. The coated metal is remarkably resistant to corrosion and paints, plastic films, and other finishing materials are tightly adherent thereto.

The solutions of this invention are aqueous in nature and contain a hexavalent chromium compound and a polymeric material which becomes insoluble on drying and/or heating. The hexavalent chromium compound may be chromic trioxide or chromic acid or any of its water-dispersible and water-soluble derivatives including chromate and dichromate salts. Particularly satisfactory results have been obtained with chromic trioxide or chromic acid and its ammonium, chromium, cadmium, manganese, strontium and aluminum dichromates. Others which may be employed include the chromate and dichromate of magnesium and the water-soluble alkali metal (including ammonium) and alkaline earth metal chromates and dichromates.

The proportion of hexavalent chromium need be only that amount required to impart insolubility to the film and corrosion-resistance and/or adhesiveness for paints to the metal. When using polyacrylic acid as the polymeric vehicle, the optimum relative proportions of chromic trioxide ($CrO_3$) to resin (or organic vehicle material in the solution) lie, preferably, in the range of about 8:1 to 1:1 by weight. When greater proportions of hexavalent chromium are employed the coating is difficult to insolubilize and the coating is likely to be tacky upon standing in a humid atmosphere. If greater proportions of resin are employed the corrosion resistance of the metal and adhesion of paint and other finishing materials thereto are likely to be not quite as good. Specifically, when polyacrylic acid is employed as the polymeric vehicle hexavalent chromium equivalent to at least 0.25 to 0.5% by weight of chromic trioxide ($CrO_3$), based on total volume of solution, seems indicated as necessary to yield insoluble coatings. Entirely satisfactory results are usually obtained with these vehicles with from 0.5 to 4% (wt./vol.). Greater proportions may be utilized up to limit of the solubility or stability in the solution, although additional benefit is not always obtained with $CrO_3$ contents above about 6%.

The polymeric vehicle of this invention is polyacrylic acid which is dispersible in water, that is, it is either emulsifiable or soluble in water and can be dried or baked to an insolubilizable or insoluble form on the metal in the presence of hexavalent chromium. By "insolubilizable" is meant that the aqueous solution or dispersion of vehicle and chromium compound can be dried to a stable, substantially-non-tacky intermediate condition (though yet appreciably soluble) and which, when more strongly heated, can be converted to a form substantially insoluble in water and organic solvents. By "insoluble" is meant that the matrix or resin and its dispersed chromium compounds is not easily loosened, or washed off, or extracted from the metal surface by water or organic solvents.

The proportion of polymeric vehicle is not critical as long as sufficient is present in the aqueous medium to deposit a finite, continuous film or coating on the metal surface. With polyacrylic acid as little as 0.1% by weight based on the weight of water has, in some cases, produced excellent, insoluble coatings. In general, at least 0.5% polymer is required for best corrosion resistance and paint adhesion. The proportion of the vehicle can be increased up to the limit of its solubility or stability in water, if desired. Usually, however, dilute solutions containing from about 0.5% to about 4% will be found satisfactory under most commercial operating conditions. The optimum ratios given above should be employed for best corrosion resistance and paint adhesion. The viscosity of the solution will vary, of course, with the proportion and nature of the polymeric vehicle and can be increased or decreased by the addition of suitable thickeners, thinners and modifiers, and other additives, if desired.

The solution applied to the metal surface can either be acidic or alkaline in nature. For example, solutions containing 0.5 to 6% chromic trioxide (as chromic acid) and 0.5 to 4% of polyacrylic acid are quite acidic in nature yet are stable. Polyacrylic acid can be partially or completely neutralized, for example, with ammonia, before or after admixture with a chromium compound. Acidic solutions containing chromic acid can be partially neutralized, for example with ammonium hydroxide and various amines, phosphates, etc., to adjust the pH of the solution anywhere in the range of pH of 1 to 10 for greater storage stability. In general, unneutralized chromic acid solutions on steel produce coatings superior to those produced by the more alkaline solutions, and are preferred. However, in the case of some metals such as aluminum, for example, alkaline solutions, produce coatings having superior appearance and better individual properties.

Fixing of the coating on the surface of the metal may be accomplished simply by drying the coating on the surface. In most cases a coating dried at ordinary temperatures (i.e. 200° F. or below) will be appreciably soluble in water yet it has utility since it can be handled and may be painted and baked to insolubility along with the paint or other finishing material. Where a rapidly-reactive polymeric vehicle is employed, air drying may produce an insoluble film. In most cases, however, additional heat is usually required to convert the oxidizable resinous vehicle to an insoluble state. In such condition the hygroscopic chromic trioxide ($CrO_3$) is better protected against humidity and the metal may be handled and stored without difficulty. For these purposes temperatures above about 200° F. are usually required. At temperatures from above 200° F. to about 500° F. films of the solutions of polyacrylic acid with chromic acid are rendered insoluble in as little as 1 to 5 minutes. In no case should the coating be heated so strongly or for a time sufficient to appreciably char the organic polymeric vehicle. Drying in an air oven or under infrared radiation can be employed. Induction heating could also be used. The metal requires no preliminary treatment unless it is corroded, scaled, dirty or oily. In the former cases, an acid pickle will remove corrosion, oxide or scale and in the latter case an alkaline cleaner such as sodium hydroxide, sodium orthophosphate, sodium orthosilicate, and others, or a solvent treatment may be employed to remove dirt and oil. Following the cleaning step the metal should be rinsed to prevent drag-over of acid, alkali or solvent to the coating solutions.

The aqueous coating solution may be applied by dipping, spraying, roller coating, flooding or any other method which will provide a uniform film of solution on the metal surface. The wetted metal surface is then dried and/or baked to insolubility.

The invention will now be described more specifically with reference to certain specific examples which are intended as illustrative only.

Example 1

Water solutions containing 25% by weight of polyacrylic acid each containing a polymer of a different molecular weight range were utilized to prepare coating solutions in this example. These commercial solutions were known as "Acrysol A-1" and "Acrysol A-3." Cold rolled steel panels which had been degreased by a solvent vapor treatment and then dry rag wiped were immersed for one minute in a bath containing 25 lbs./100 gal. of sodium orthosilicate at 180–200° F., rinsed for 15 seconds in hot water and then dipped into solutions containing from 0.1 to 4% polyacrylic acid and from 1 to 4% $CrO_3$ at room temperature. The coatings were insolubilized under infrared lamps at 250° F. for 1 to 2 minutes. Excellent results were obtained at 0.5 to 4% polyacrylic acid and 2 to 4% chromic acid. Perfect test results were obtained on painted panels prepared with solutions containing 2 to 4% polyacrylic acid and 2 to 4% chromic acid.

Example 2

In solutions containing either 0.5% polyvinyl alcohol (PVA) or 2% polyacrylic acid (Acrysol), certain chromate and dichromate salts were utilized as the source of hexavalent chromium. Control solutions containing chromium nitrate were employed to demonstrate the effect of trivalent chromium. The solutions employed were as follows:

| Bath No. | Percent PVA | Percent Acrysol | Percent Chromium Compound |
|---|---|---|---|
| I* | | 2.0 | 4.86 $Cr(NO_3)_3$ |
| II | | 2.0 | 4.90 $Cr_2(Cr_2O_7)_3$ |
| III | | 2.0 | 2.59 $Cr_2(Cr_2O_7)_3$ |
| IV | | 2.0 | 5.23 $Mn\ Cr_2O_7$ |
| V | | 2.0 | 7.21 $Cd\ Cr_2O_7$ |
| VI | | 2.0 | 7.54 $Mg\ Cr_2O_7$ |
| VII | | 2.0 | 4.78 $Al_2(Cr_2O_7)_3$ |
| VIII | 0.5 | | 1.86 $Al_2(Cr_2O_7)_3$ |

*Control.

Cold rolled steel panels, which had been vapor degreased, rag wiped and cleaned by dipping for 2 minutes in a bath containing 25 lbs./100 gal. of sodium orthosilicate at 180 to 200° F., and then spray rinsed with hot water, were dipped into these solutions for 5 seconds at room temperature. The wetted panels were then heated for 5 minutes at 400° F. in an air oven. In every case the hexavalent chromium containing solutions provided a good looking insoluble film. The coated panels were then primed and painted in the usual fashion and compared to phosphate coated control panels and several panels made without a vehicle and containing only chromium nitrate.

The Acrysol solutions containing the dichromates of chromium, manganese, cadmium, and aluminum gave similar results, the properties of the painted panels being only slightly poorer than that of the chromic acid control. The coatings obtained from magnesium chromate and magnesium dichromate were not quite as good as those obtained from the other dichromate salts. In most cases, however, the dichromate coated panels were as good or better than the phosphate-coated control panels. The dichromate solutions were more stable than comparable solutions made with chromic acid. Chromium dichromate was stable in polyacrylic acid. In both cases 1.98% and 4.86% chromium nitrate was without substantial effect as regards improving the corrosion-resistance of the bare metal panels. It was apparent, therefore, that it is the hexavalent chromium in the coatings, and not the trivalent or lower valence chromium, that functions in the coatings of this invention to protect the metal and improve paint adhesion.

Example 3

A series of solutions were prepared from polyacrylic acid and chromic acid containing from 0.25 to 2% resin and from 1 to 6% chromic acid. Coated steel panels prepared by heating at 300 to 350° F. and at 400° F. revealed several interesting facts. Whenever the ratio of resin: chromic acid was greater than about 1:4, i.e. a higher proportion of resin, coatings were obtained that were not as good in physical tests as the 1:4 ratio coatings. Likewise, when the proportion of chromic acid was increased beyond 1:4 the coatings required heating for as much as 20 minutes at temperatures of about 400° F. to become insoluble. Other data disclosed in the previous examples indicate that with polyvinyl alcohol the optimum resin: $CrO_3$ ratio also is around 1:4. This would seem to indicate that these resins are not acting solely as a wetting agent or matrix to disperse and bind the chromium in the coating, but that there is an interaction between the resinous vehicle and the chromium during drying and baking.

*Example 4*

Coatings from solutions containing about 0.5% polyvinyl alcohol or 0.5% polyacrylic acid, as the polymeric vehicle, and about 2% chromic acid were prepared on steel panels by dipping the cleaned panels in the solution and force drying for several minutes at about 200° F. The coatings produced were substantially soluble in water. However, when painted in a conventional manner, with primer and enamel coats, and then baked to cure the enamel films, the above panels showed salt spray corrosion resistance and paint adhesion values substantially equivalent to similar painted panels prepared by first baking the bare coatings at 350° F. to reach insolubility before application of paint. This would seem to indicate that the coatings of this invention can develop full insolubility in situ even though covered with paint. Where the metal is not stored and exposed to a humid atmosphere before painting, therefore, it appears it may not be necessary to first bake the coatings to insolubility. Baking is desirable, in most instances however, since chromic acid picks up moisture and stacked panels are apt to stick together and damage the coatings.

What is claimed is:

1. A method of coating a metal surface with an insoluble corrosion-resistant and adhesion-promoting material consisting of the steps of applying to the entire surface a film of an aqueous admixture consisting essentially of water, about 0.25% to about 6% by weight of a hexavalent chromium compound and polyacrylic acid and heating the said film at a temperature in the range of about 250° F.–400° F. to insolubilize the same so as to cover the entire metal surface.

2. A method as defined in claim 1 wherein the hexavalent chromium compound is chromic acid.

3. A method of coating a metal surface with an insoluble corrosion-resistant and adhesion-promoting material consisting of the steps of applying to the entire surface a film of an aqueous admixture consisting essentially of water, about 0.25% to about 6% by weight of a hexavalent chromium compound and polyacrylic acid, said hexavalent chromium compound being present in said admixture relative to said polyacrylic acid in the ratio between about 8 $CrO_3$: 1 polyacrylic acid to about 1 $CrO_3$: 1 polyacrylic acid by weight, and heating the said film at a temperature in the range of about 250° F.–400° F. to insolubilize the same so as to cover the entire metal surface.

4. A method as defined in claim 3 wherein the hexavalent chromium compound is chromic acid.

References Cited in the file of this patent

UNITED STATES PATENTS

| | | |
|---|---|---|
| 1,981,102 | Hagedorn et al. | Nov. 20, 1934 |
| 2,025,996 | Maillet | Dec. 31, 1935 |
| 2,148,862 | Kern | Feb. 28, 1939 |
| 2,174,629 | Greiner | Oct. 3, 1939 |
| 2,184,310 | Meigs et al. | Dec. 26, 1939 |
| 2,296,070 | Thompson et al. | Sept. 15, 1942 |
| 2,385,800 | Douty et al. | Oct. 2, 1945 |
| 2,465,295 | Strauss | Mar. 22, 1949 |
| 2,519,348 | Burnell et al. | Aug. 22, 1950 |
| 2,562,119 | Haon | July 24, 1951 |
| 2,567,108 | Hochberg | Sept. 4, 1951 |
| 2,692,826 | Neugebauer et al. | Oct. 26, 1954 |
| 2,716,060 | Lupo | Aug. 23, 1955 |

FOREIGN PATENTS

| | | |
|---|---|---|
| 978,446 | France | Nov. 29, 1950 |

OTHER REFERENCES

Mattiello: "Protective and Decorative Coatings," volume II, pages 271 and 278, John Wiley and Sons, New York, 1942.